(12) United States Patent
Bilquez (10) Patent No.: US 12,515,231 B2
(45) Date of Patent: Jan. 6, 2026

(54) FLUID PRODUCT RESERVOIR AND DISPENSER

(71) Applicant: APTAR FRANCE SAS, Le Neubourg (FR)

(72) Inventor: Sébastien Bilquez, Marcilly sur Eure (FR)

(73) Assignee: APTAR FRANCE SAS, Le Neubourg (FR)

( * ) Notice: Subject to any disclaimer, the term of this patent is extended or adjusted under 35 U.S.C. 154(b) by 202 days.

(21) Appl. No.: 18/277,807

(22) PCT Filed: Feb. 22, 2022

(86) PCT No.: PCT/FR2022/050310
§ 371 (c)(1),
(2) Date: Aug. 18, 2023

(87) PCT Pub. No.: WO2022/180335
PCT Pub. Date: Sep. 1, 2022

(65) Prior Publication Data
US 2024/0131542 A1    Apr. 25, 2024
US 2024/0226933 A9    Jul. 11, 2024

(30) Foreign Application Priority Data

Feb. 23, 2021 (FR) ...................................... 2101755

(51) Int. Cl.
*B05B 11/00* (2023.01)

(52) U.S. Cl.
CPC ...... *B05B 11/0008* (2013.01); *B05B 11/0089* (2013.01)

(58) Field of Classification Search
CPC ............. B05B 11/0008; B05B 11/0089; B05B 11/001
USPC .......................................... 222/80, 82, 89, 91
See application file for complete search history.

(56) References Cited

U.S. PATENT DOCUMENTS

| 2,412,728 A | 12/1946 | Goodhue |
| 4,770,323 A * | 9/1988 | Debard ................ B65D 83/382 222/89 |
| 6,269,976 B1 * | 8/2001 | DeJonge .................. B67B 7/26 222/83.5 |

(Continued)

FOREIGN PATENT DOCUMENTS

| EP | 2092985 A1 | 8/2009 |
| WO | 2018/115306 A1 | 6/2018 |
| WO | 2020/148332 A1 | 7/2020 |

OTHER PUBLICATIONS

International Search Report of PCT/FR2022/050310 dated May 24, 2022 [PCT/ISA/210].

*Primary Examiner* — David J Walczak
(74) *Attorney, Agent, or Firm* — Sughrue Mion, PLLC (57) ABSTRACT

A reservoir for a fluid product having a container defining a neck and a mounting part mounted on the neck, the mounting part forming a basket arranged at the neck and a plunger tube, which extends from the basket into the container, the plunger tube being initially sealed by a sealing member. The reservoir further has an insert located in the basket and having a piercing element capable of moving between an initial position, in which the sealing member forms a seal, and a final position, in which the sealing member is displaced by the piercing element to an open state.

20 Claims, 6 Drawing Sheets

(56) References Cited

U.S. PATENT DOCUMENTS

| | | |
|---|---|---|
| 10,226,782 B2 | 3/2019 | Yamaguchi et al. |
| 10,737,285 B2 * | 8/2020 | Toh .................... B05B 11/0054 |
| 2020/0156833 A1 | 5/2020 | Le et al. |

* cited by examiner

FLUID PRODUCT RESERVOIR AND DISPENSER

CROSS REFERENCE TO RELATED APPLICATIONS

This application is a National Stage of International Application No. PCT/FR2022/050310 filed on Feb. 22, 2022, claiming priority based on French Patent Application No. 2101755 filed on Feb. 23, 2021.

The present invention relates to a fluid product reservoir comprising a container defining a collar and a mounting part mounted on the collar. The mounting part forms a basket disposed at the collar and a dip tube which extends from the basket into the container. The dip tube is initially blocked by a sealing member, which can be presented in the form of a membrane to be pierced, a stopper to be dislodged, etc. This type of reservoir is often used as a refill on which a top assembly comprising a pump or a valve is removably mounted, so as to be able to be dismounted from a reservoir to be remounted on a new reservoir.

The favoured fields of application of the present invention are those of cosmetics, food, household products or also pharmacy.

In the prior art, documents U.S. Pat. No. 10,226,782 and WO2018115306 are already known, which describe reservoirs of this type, with a dip tube initially blocked by a sealing member. In document U.S. Pat. No. 10,226,782, the dispensing member is specially designed to release the sealing member, which will fall to the bottom of the container. The dispensing member will also pierce a membrane to form a vent passage for the container. In document WO2018115306, it is a tube which pierces a film. In both cases, it is an external member which is used to release the passage of the dip tube. There is therefore a risk of incorrect handling or adaptation during the connection operation.

The present invention aims to overcome this problem linked to the release of the dip tube. Another aim of the invention is to be able to use a standard dispensing member to generate the piercing or the movement of a sealing member in the dip tube.

To do this, the present invention proposes a fluid product reservoir which further comprises an insert disposed in the basket and comprising a piercing element which can be moved between an initial position wherein the sealing member is blocking and a final position wherein the sealing member is moved into a passing state by the piercing element. Thus, it is no longer the dispensing member which pierces or dislodges the sealing member, but a part which forms an integral part of the reservoir, since initially inserted in the basket of the mounting part. This insert is certainly moved by the dispensing member, but it is not the dispensing member which acts directly on the sealing member. This insert could be considered as a thrust transmission element which will also pierce or dislodge the sealing member. Thus, the insert forms an integral part of the reservoir and not of the dispensing member.

According to the invention, the insert forms a receiving housing for an inlet sleeve of a dispensing member (pump or valve), the receiving housing being integral with the movement of the piercing element. The housing and the piercing element constitute a type of extender for the inlet sleeve, but this extender forms part of the reservoir, and not of the dispensing member.

According to an advantageous feature of the invention, the insert is integral with the basket in the initial position and in the final position. It can even be said that the insert is permanently integral with the basket, even if its piercing element is moved in the basket by the inlet sleeve of the dispensing member which is received in the receiving housing.

According to an embodiment, the basket and the insert can together delimit a buffer space, which advantageously communicates with the outside in the final position of the insert and which advantageously communicates with the container through a one-directional flap or a filter letting air from the buffer space enter into the container. On the other hand, the buffer space can be isolated from the outside in the initial position. Thus, in case of fluid product leaking through the flap or filter, it will be stored in the buffer space and will not soil the user, nor even the dispensing member.

According to another aspect of the invention, the mounting part can comprise a fixing bushing for the mounting of a dispensing member, such as a pump, comprising an inlet sleeve and a fixing ring adapted to engage with the fixing bushing. This fixing bushing is preferably threaded, just like the fixing ring, such that the movement or piercing of the sealing member by the piercing element and/or the fitting of the inlet sleeve in the receiving housing occurred during the screwing of the ring on the bushing.

According to a practical embodiment, the insert can be slidingly mounted in the basket between the initial and final positions, the insert being advantageously in sealed contact with the basket in the initial position and advantageously in non-sealed contact with the basket in the final position. In more concrete terms, the insert can comprise a sliding lip, which is in sealed contact with a cylindrical wall of the basket in the initial position, can then sealingly slide in the cylindrical wall, this cylindrical wall which could form a raised part (hollow or projecting) which will generate a sealing defect in the final position.

According to a practical embodiment, the insert can comprise a deformable membrane connecting the piercing element to a fixed edge integral with the basket, the insert being advantageously made integrally with the mounting part. The basket and the insert can be moulded flat side-by-side by being connected by a hinge or a flexible connection: the insert then being folded by pivoting in the basket. Preferably, the fixed edge of the insert is snap-fitted on the basket.

In the two embodiments, the insert can be snap-fitted in the basket in the final position. A friction blocking can also fulfil the holding function of the snap-fitting in the final position. The aim is to prevent the removal of the insert outside of the basket, when the dispensing member is separated from the reservoir: it is necessary that the insert remains in place in the basket.

Advantageously, the insert can form an insertion shaft, which is blocked by a tearable or pierceable lid, which advantageously extends to an upper edge of the basket. The insertion shaft can be surrounded by a flat annular slot which is flush with the upper edge of the basket, such that the lid can extend flat both on the flat annular slot and the upper edge. This lid does not need to be sealed, since the reservoir is already blocked by the sealing member. The lid must simply prevent dirt entering into the insert through its insertion shaft. It also gives information to the user that the reservoir has never been opened. The lid can remain in place, then pierced, or on the contrary, can be removed by the user.

According to a practical aspect, the sealing member is a pierceable membrane which remains connected to the dip tube once pierced, the dip tube advantageously forming an internal shoulder under which the pierceable membrane, once pierced, is housed. Preferably, the pierceable membrane is made integrally with the rest of the mounting part.

Advantageously, an upper extension of the basket can form a threaded bushing which projects beyond a fixing cup, which engages, advantageously snap-fitted, around the collar of the container. Thus, the container can be extremely simple, for example in the form of a can blown with a collar provided with an external snap-fitting profile.

The present invention also defines a fluid product dispenser comprising a dispensing member, such as a pump, comprising an inlet sleeve and a fixing ring to fix the dispensing member on a fluid product reservoir such as defined above comprising a receiving housing for the inlet sleeve.

Advantageously, the mounting part can form a fixing bushing, the fixing ring engaging, advantageously threaded, with the fixing bushing on an axial fixing stroke, the engagement of the inlet sleeve in the receiving housing and/or the movement of the sealing member by the piercing element occurring advantageously during the axial fixing stroke. The pump or the valve is therefore in fluid communication through the insert and the dip tube, the sealing member of which has been neutralised by the movement of the insert under the urging of the inlet sleeve.

Preferably, the sealing member can be a pierceable membrane, the fixing ring can be a fixing ring to be screwed, the piercing element can be a bevelled tube section, the fixing ring to be screwed, during its screwing on the threaded bushing, moves the inlet sleeve and the insert over an axial screwing stroke, the bevelled tube section piercing the pierceable membrane advantageously during this axial screwing stroke.

The scope of the invention resides in the fact of integrating piercing or "unsealing" means in the reservoir, so as to not need to adapt the dispensing member, which can therefore be standard: its only function being to push, and no longer to pierce or to intervene directly on the sealing means. The removable fixing by screwing (or bayonet) of the dispensing member on the reservoir of the invention makes it possible to multiply the forces to facilitate the fitting of the inlet sleeve in the receiving housing and/or the piercing of the sealing member.

A significant advantage of the invention is that the dispensing member, and more specifically its inlet sleeve, can be separated from the reservoir in a perfect state of cleanliness, given that only the inside of the inlet sleeve is in contact with the fluid product: the outside of the sleeve is embedded in the housing of the insert. And even in case of leakage through the flap or the filter, the fluid product remains in the buffer space. Due to this, the dispensing member can be removed from an empty reservoir and reassembled on a filled new reservoir without risking depositing fluid product anywhere.

It must be noted that the fact of making the threaded bushing and the sealing member (pierceable membrane) in one and the same part, i.e. the mounting part, is a feature which could be implemented independently of the fact that the basket contains an insert. This feature is advantageous in two ways. Firstly, the axial distance between the threading of the reservoir and the pierceable membrane is constant: this is not the case in document U.S. Pat. No. 10,226,782. The piercing of the membrane during the screwing stroke is therefore easier to guarantee. Secondly, the container can be made more simply without external threading. A protection could therefore be sought for a reservoir with a mounting part forming a threaded bushing and a sealing member.

The invention will now be described more fully below, with reference to the accompanying drawings, giving as non-limiting examples, two embodiments of the invention.

Figure 1:
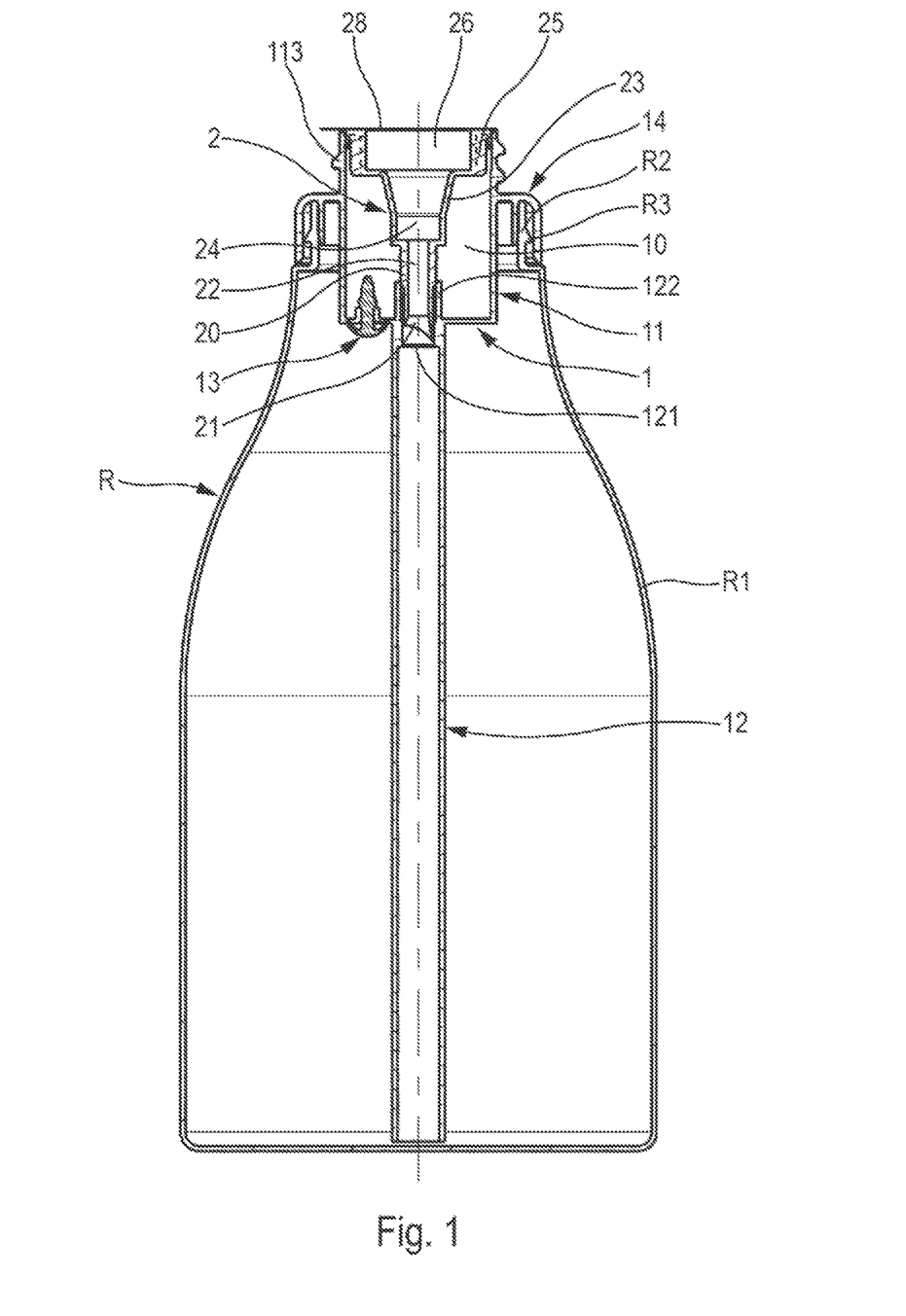
FIG. 1 is a vertical cross-sectional view through a fluid product reservoir according to a first embodiment of the invention.

First, FIG. 1 will be referred to, to generally describe the overall design of a fluid product reservoir according to the first embodiment of the invention. The reservoir R comprises a container R1 comprising a collar R2 which can be externally provided with one or more fastening profile(s) R3, preferably in the form of snap-fitting profiles. The container R1 can very simply be made in the form of a can. It can be obtained using a blowing method, given that the design of its collar R2 is very simple.

The reservoir R also comprises a mounting part 1 which is preferably made by injection moulding of suitable plastic material. The mounting part is preferably one-piece, except for its single one-directional flap 13, as will be seen below. This mounting part 1 comprises a basket 11, a dip tube 12, a one-directional flap 13 and a fixing cup 14. The basket 11, the dip tube 12 and the cup 14 can be made as a single part. Separate embodiments can however be considered. In particular, the dip tube 12 could be mounted on the basket 11. The dip tube 12 is connected to the lower end of the basket 11 and extends into the container R1 to the proximity of its bottom. The dip tube 12 can be rigid or flexible. In its initial state, as represented in FIG. 1, the communication between the basket 11 and the dip tube 12 is cut by a sealing member 121, which is, in this case, disposed inside the dip tube 12, in the proximity of the basket 11. This sealing member 121 is presented, in this case, in the form of a pierceable membrane which is made integrally with the rest of the mounting part 1. Instead of this pierceable membrane, a transferred lid or even a part capable of being moved between a blocking state and a through state could also be used. The sealing member 121 is, in this case, made inside the dip tube 12, but it could also be disposed at the basket 11. The function of this sealing member is to cut the communication between the inlet of the basket 11 and the outlet of the dip tube 12. It can be seen in FIG. 1, that the dip tube 12 is extended inside the basket 11 in the form of a tubular section 122.

The basket 11 is disposed at the collar R2: it extends downwards inside the container R1 and also upwards by forming a bushing 113 which is externally threaded. It can be noted that the basket 11 has an overall cylindrical shape with its bottom partially blocked and its upper end open.

The fixing cup 14 extends radially outwards from the basket 11 to engage, advantageously snap-fitted, with the collar R2 of the container R1. A fixing by screwing can be considered, but is not preferable.

The basket 11 also defines a seat for the one directional flap 13 which only enables the intake of external air inside the container R1. Any fluid product exiting outside of the container R1 through this flap 13 is prevented.

The reservoir R also comprises an insert 2 which is mainly housed inside the basket 11. The insert 2 mainly has a funnel shape, with a passage section which decreases from top to bottom. The insert 2 comprises a piercing element 21 which is formed at the lower end of a pipe 20 which is partially engaged inside the dip tube 12, or more specifically its tubular section 122. The piercing element 21 can be presented in the form of a bevelled tube section, and advantageously sharp. Internally, the pipe 20 defines a passage conduit 22. In the initial position, as represented in FIG. 1, the piercing element 21 is disposed in the proximity or in contact with the sealing member 121 which blocks the dip tube 12. Upstream of the pipe 20, the insert 2 forms a cuff 23 which internally defines a receiving housing 24, the function of which will be given below. It can be noted that the cuff 23 comprises an upper truncated part and a lower cylindrical part. The receiving housing 24 communicates directly with the passage conduit 22. Upstream of the cuff 23, the insert 2 forms a crown 25 which is engaged inside the basket 11, at its threaded bushing 113. This crown 25 defines an insertion shaft 26 which communicates directly with the receiving housing 24. It can be noted that the upper edge of the crown 25 is advantageously disposed flush with the upper edge of the threaded bushing 113. Optionally, a lid 28 can be adhered both on the upper edge of the crown 25 and the upper edge of the bushing 113, so as to prevent any introduction of body or foreign particle inside the insert 2. The lid 28 does not need to be sealingly fixed, given that the inside of the container R1 is already isolated from the outside by the sealing member 121.

It can be noted that a buffer space 10 is formed between the basket 11 and the insert 2. In the initial position, as represented in FIG. 1, this buffer space 10 cannot communicate outwards, due to the sealed contact of the crown 25 with the bushing 113, and in addition, the sealed application of the lid 28. However, the buffer space 10 can communicate with the inside of the container R1 through the one-directional flap 13, as soon as a depression is formed inside the container R1. The air contained in the buffer space 10 can thus enter inside the reservoir R1.

It can be noted that the mounting part 1 forms both the sealing member 121 and the threaded bushing 113, such that the mutual arrangement of these two elements is fixed and accurate. This is a feature which is independent of the fact that the basket 11 contains an insert 2.

Figure 2:
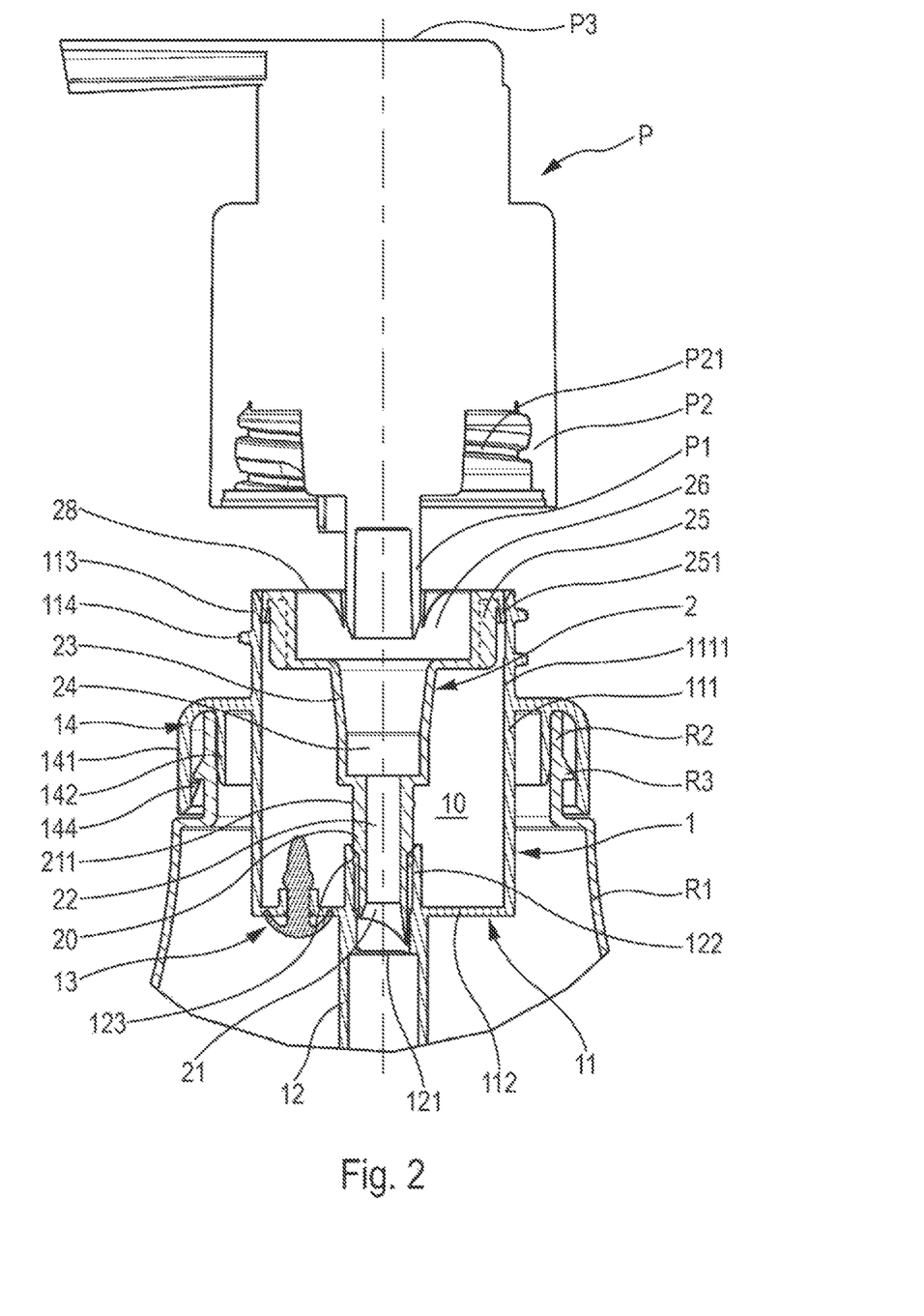
FIG. 2 represents the top part of FIG. 1 with a dispensing member being transferred onto the reservoir.

In FIG. 2, the reservoir of FIG. 1 is seen, which is always in its initial position, with its sealing member 121 intact. Also, a dispensing member P is seen, which is only represented very schematically. This dispensing member P, which can integrate a pump or a valve, also comprises an inlet sleeve P1, a fixing ring P2 and a pushbutton P3. The inlet sleeve P1 defines an internal conduit which communicates with the pump chamber or valve chamber, generally through an inlet flap (not represented). The inlet sleeve P1 is of a type which is absolutely conventional, adapted to receive a conventional dip tube by fitting around or inside the inlet sleeve P1. As regards the fixing member P2, it preferably comprises an internal threading P21, the step of which corresponds with that of the threaded bushing 113 of the mounting part 1 of the reservoir according to the invention. It can be said that the dispensing member P comprises no inventive feature, and that it is consequently not critical for the invention.

It can be seen that the dispensing member P has already been transferred onto the reservoir of the invention, with its inlet sleeve P1 which has already entered inside the insertion shaft 26 of the crown 25 by tearing or piercing the lid 28. In a variant, the lid 28 can be removed before engagement of the sleeve P1 inside the insert 2.

Given that FIG. 2 represents the upper part of the reservoir in an enlarged manner, more details can be seen there. In particular, it can be seen that the fixing cup 14 comprises an external skirt 141 which forms one or more snap-fitting tooth/teeth 144 intended to cooperate with the profiles R3 of the collar R2. The cup 14 also defines a self-joining lip 142 intended to come into sealed contact with the internal wall of the collar R2 to achieve a sealing there. Moreover, the threadings 114 formed on the external wall of the fixing bushing 113, which extends the basket 11 outwards, are clearly distinguished. The internal wall of the bushing 113 is fully cylindrical and the crown 25 forms an annular sealing lip 251 which comes into sealed sliding contact inside the bushing 113. However, it can be noted that the internal cylindrical wall 111 of the basket 11 forms one or more vertical rib(s) 1111 which thus break the cylindricity of the basket. It is thus easily understood that the sliding of the insert 2 downwards will bring the annular sealing lip 251 to this/these rib(s) 1111 so as to create a sealing defect. It can also be noted that the pipe 20 externally defines a snap-fitting bead 211 intended to engage inside a snap-fitting groove 123 formed inside the cylindrical section 122, which forms an extension of the dip tube 12 inside the basket 11.

In this initial position (FIG. 2), the inside of the container R1 is isolated from the outside by the sealing member 121, the one-direction flap 13, the annular sealing lip 251 and the lip 142. The buffer space 10 is thus isolated both from the outside and from the container R1. The inside of the insert 2 is blocked upstream by the lid 28 and downstream by the sealing member 121.

Figure 3:
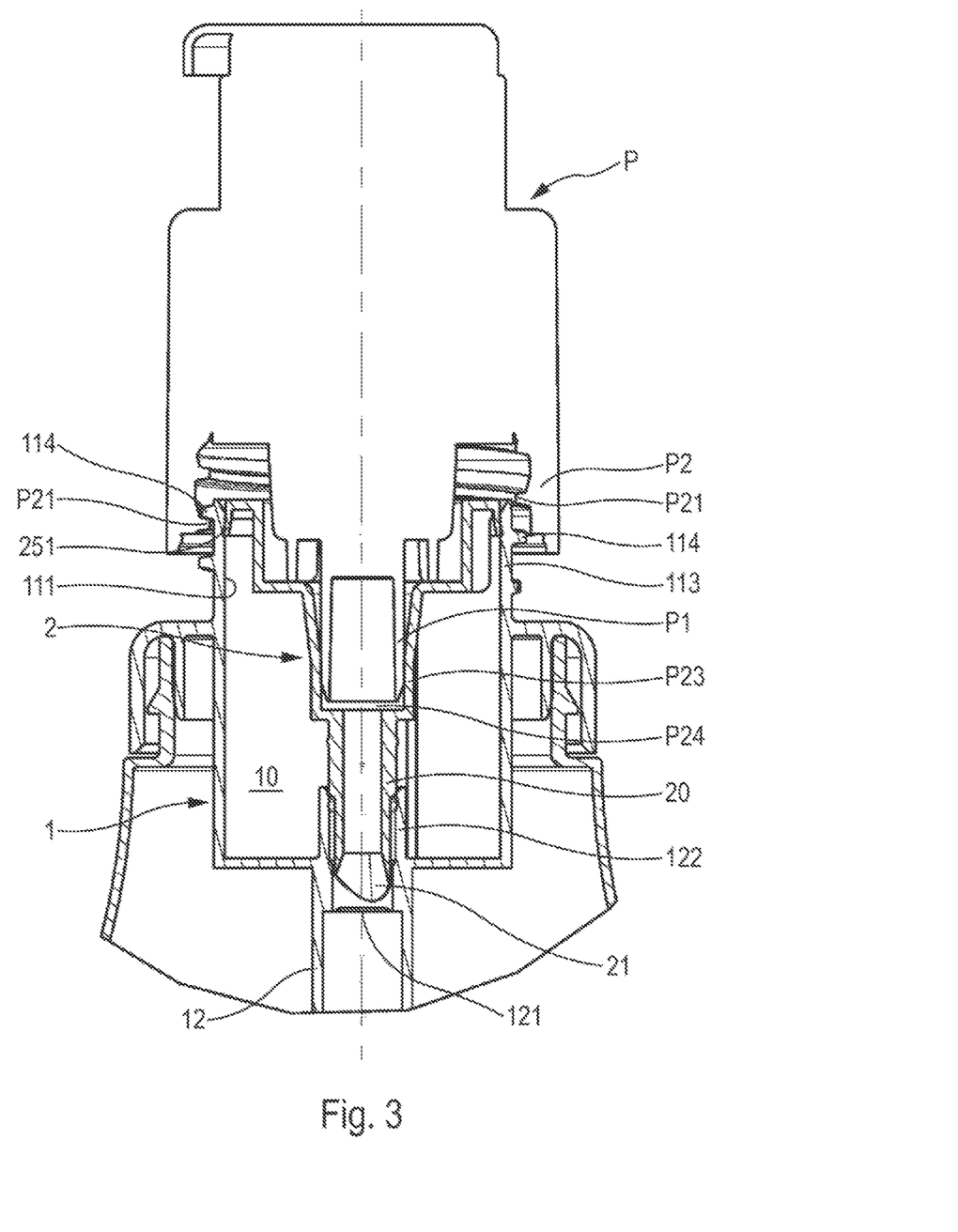
FIG. 3 is a view similar to that of FIG. 2, showing the dispensing member being screwed on the reservoir of the invention.

In FIG. 3, it is seen that the internal threading P21 of the fixing ring P2 of the dispensing member P just engages with the external threading 114 of the bushing 113. The insert 2 is always in its initial state, held in position by the friction of the lip 251 in the drum 111 of the basket 11 and its pipe 20 inside the tubular section 122. This start of threaded engagement however has enabled the fitting of the inlet sleeve P1 inside the receiving housing 24 formed by the cuff 23. The sleeve P1 is thus already in its final mounting position inside the receiving housing 24. The sealing member 121 is always intact, since the piercing element 21 is still disposed away.

Figure 4:
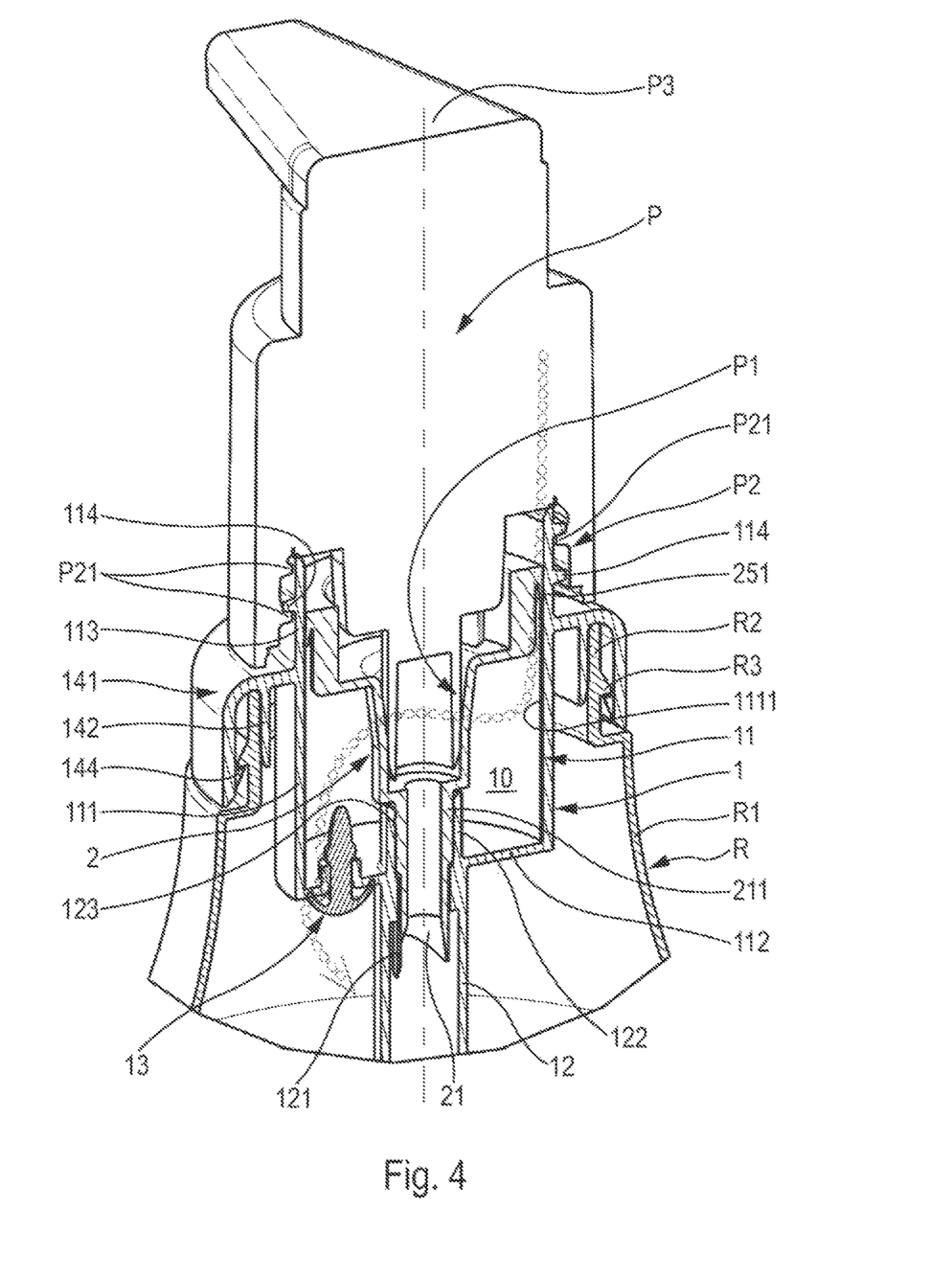
FIG. 4 is a perspective cut view showing the dispensing member in the final mounting position on the reservoir of the invention.

In FIG. 4, it can be seen that the fixing ring P2 is in its final screwing position with its threading P21 in final engagement with the threading 114 of the bushing 113. The insert 2 has been moved by sliding inside the basket 11, which is conveyed by a corresponding movement of its pipe 20 inside the tubular section 122 and the dip tube 12, leading to the piercing of the sealing member 121 by the piercing element 21. The lip 251 of the crown 25 is thus disposed at the top of the rib(s) 1111, thus creating a sealing defect. The snap-fitting bead 211 is housed inside its corresponding snap-fitting groove 123. The final mounting position is thus reached. The buffer space 10 makes it possible to make the inside of the reservoir R1 communicate with the outside through the one-directional flap 13 and the sealing defect between the lip 251 and the rib 1111. The course of the incoming air is represented by a bubble path.

It can be noted that the movement of the insert 2 inside the basket 11 occurs during the screwing phase of the ring P2 on the bushing 113. In other words, the axial movement of the insert 2 corresponds substantially to the axial screwing stroke of the dispensing member P on the reservoir R. Preferably, the piercing of the sealing member 21 by the piercing element 21 occurs during this axial screwing stroke. Advantageously, the fitting of the inlet sleeve P1 in the receiving housing 24 also occurs during this axial screwing stroke.

Without moving away from the scope of the invention, other fixing means can be designed to fix the dispensing member P on the reservoir R. Instead of the threadings P21 and 114, other types of profiles can be designed, enabling a fixing, for example, by bayonet or by snap-fitting. In this case, there is always an axial fixing stroke, during which it is preferable that the piercing and/or the fitting occurs.

Figure 5A:
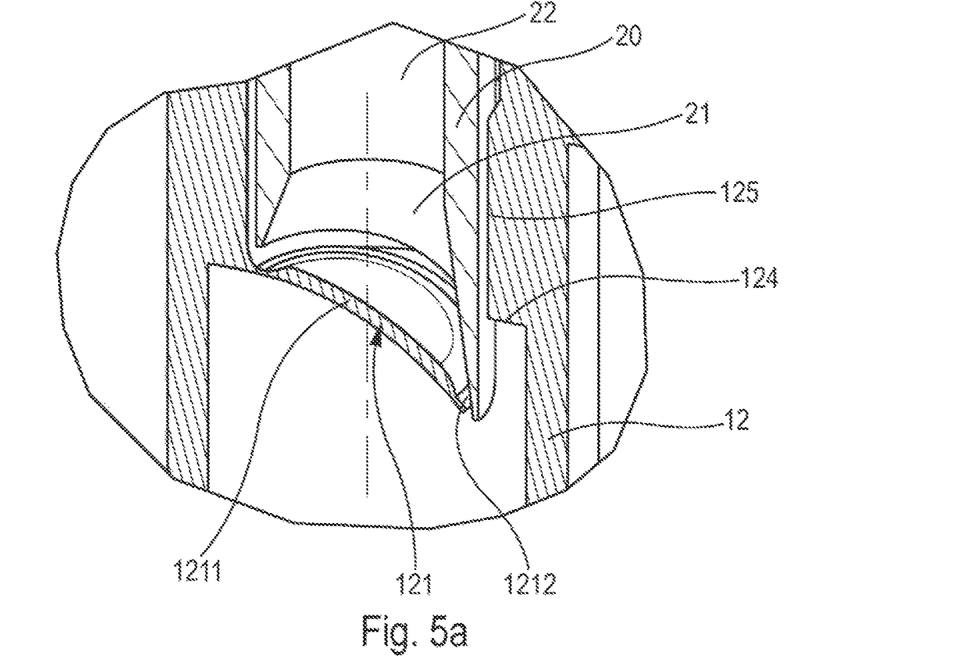
FIGS. 5a and 5b are perspective cut views showing the piercing operation of the sealing membrane.
Figure 5B:
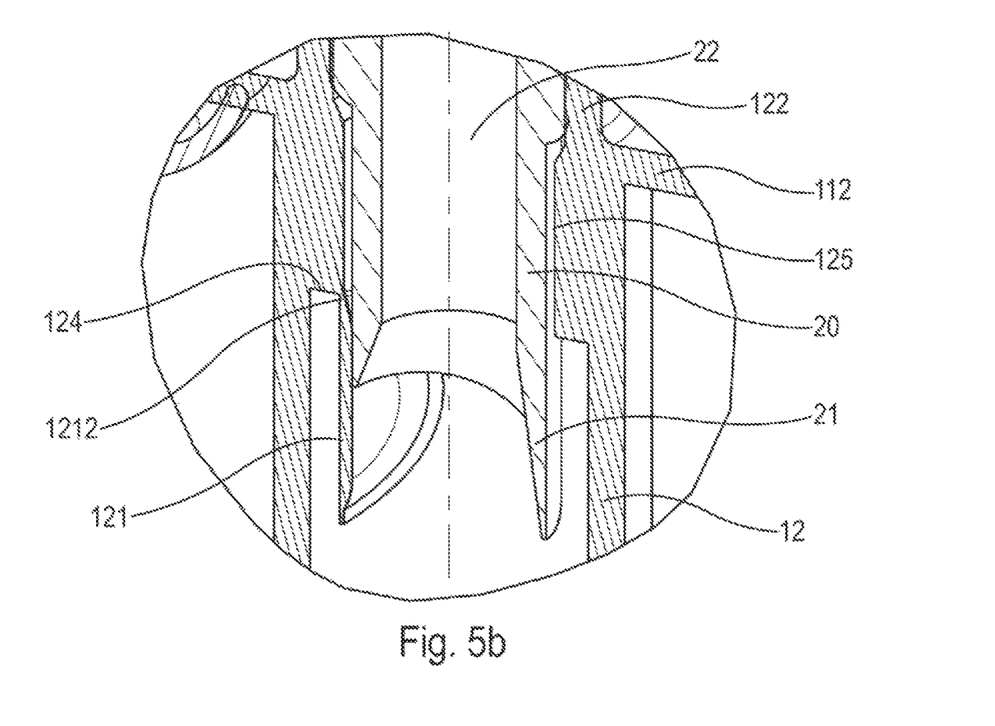

By referring to FIGS. 5*a* and 5*b*, which are very enlarged views, the way in which the sealing member 121 is made inoperative by the piercing element 21 can be seen. It can be seen that the pipe 20 ends by a tube section which is both bevelled and thinned, forming the piercing element 21. The dip tube 12, the section of which is preferably constant over the main part of its length, in this case comprises an inlet section 125 of reduced passage, thus forming a shoulder 124 oriented downwards. The sealing member 121 is presented in the form of a membrane which is connected to this shoulder 124. The membrane 121 comprises a central part 1211 of constant thickness and a thinned peripheral edge 1212 which is connected to the shoulder 124. Thus, when the pipe 20 is moved downwards under the urging of the inlet sleeve P1, the leading edge of the piercing element 21 will break the thinned edge 1212 of the membrane 121 progressively, given the bevelled configuration of the piercing element 21. In FIG. 5*a*, it is seen that the thinned edge 1212 is already partially cut. In FIG. 5*b*, the pipe 20 is seen in its final position, with its piercing element 21 which has entered inside the dip tube 12. The thinned edge 1212 has been fully broken and no more remains, other than a small material bridge to connect the membrane 121 to the shoulder 124. The function of this shoulder 124 is thus easily understood, which makes it possible to house the membrane 121 between the piercing element 21 and the dip tube 12. Thus, the membrane 121 is not detached from the rest of the mounting part, and does not fall to the bottom of the dip tube 12. Thus, any risk of blocking or of incorrect operation linked to the floating of the membrane 121 is avoided.

Figure 6:
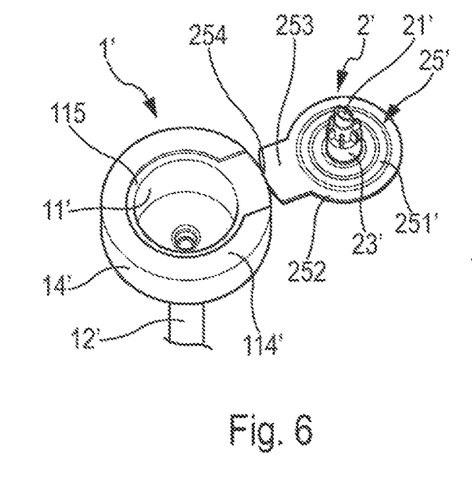
FIG. 6 is a perspective view of a mounting part and of an insert according to a second embodiment of the invention.
Figure 7A:
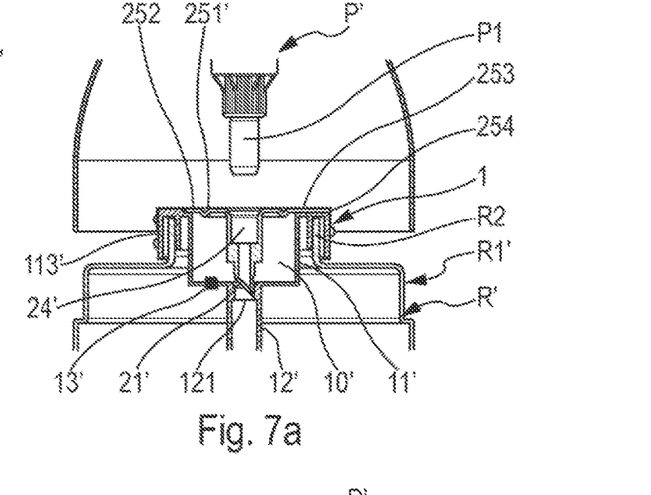
FIGS. 7a, 7b and 7c are schematic, vertical cross-sectional views through a reservoir and a dispensing member to be mounted on the reservoir.
Figure 8:
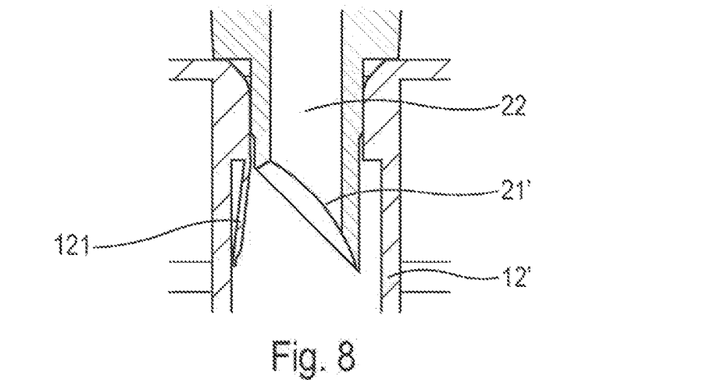
FIG. 8 is a very highly enlarged view showing the piercing of the sealing member in the final mounting position.

Reference will now be made to FIGS. 6 to 8 to describe a second embodiment of the invention. In FIG. 6, a mounting part 1' and an insert 2' are seen, which are made as a single part, for example, by injection moulding of suitable plastic material. The mounting part 1' and the insert 2' are connected by a strip 253 and a hinge 254. These two parts are moulded flat as represented in FIG. 6. The mounting part 1' also comprises a basket 11', a dip tube 12' and a fixing cup 14'. The basket 11' comprises an upper annular slot 114' forming a recessed rim 115. The basket also comprises a one-directional filter 13'. The insert 2' also comprises a piercing element 21', a receiving housing 23' and an outer crown 25' forming a deformable flexible membrane 251'. The crown 25' is bordered by a fixed annular flange 252. It is thus easily understood that it is possible to fold the insert 2' on the mounting part 1' so as to make the piercing element 21' and the receiving housing 23' enter inside the basket 11'. Doing this, the annular flat flange 252 will be housed inside the recessed rim 115 such that the crown 25' is flush with the annular slot 114' of the cup 14'. The fixed annular flange 252 can be snap-fitted, preferably non-sealingly, in the recessed rim 115. This folded configuration is represented in FIG. 7*a*. The deformable membrane 251' is in its rest state and the piercing element 21' is in extension from the sealing member 121, which can be similar or identical to that of the first embodiment. A buffer space 10' is also formed between the basket 11' and the insert 2'. The fixing cup 14' externally forms a threaded fixing bushing 113'.

Figure 7B:
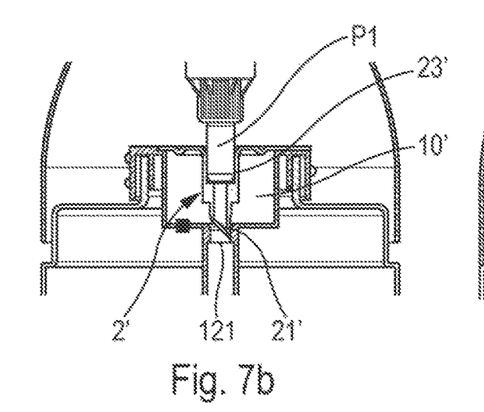
Figure 7C:
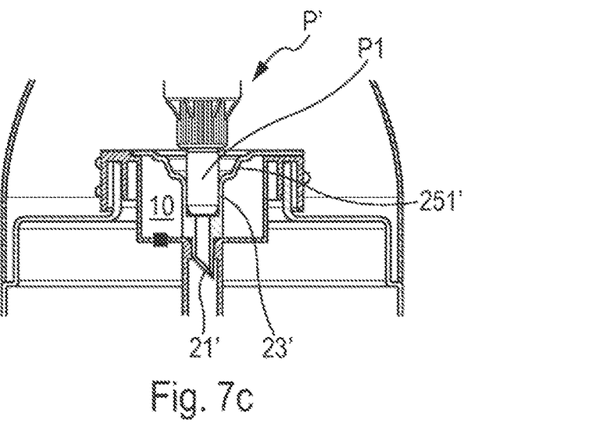

As above, the first step consists of fitting the inlet sleeve P1 inside the receiving housing 23'. This is represented in FIG. 7*b*. The insert 2' is always in its initial state with the sealing member intact.

The fixing of the dispensing member P' on the reservoir R' has the effect of moving the inlet sleeve P1, which leads to a deformation of the membrane 251' and a movement of the piercing element 21' which thus releases the sealing member 121, as represented enlarged in FIG. 8.

Thus, in this second embodiment, the insert 2' does not slide inside the basket 11', but is however moved by deformation of its membrane 251'.

Although made as a single part, it can also be considered to make the insert 2' separately and transfer it inside the basket 11'. In this case, the strip 253 and the hinge 254 are removed.

Just like in the first embodiment, it is preferable that the piercing of the sealing member 121 and/or the fitting of the inlet sleeve P1 in the receiving housing 23' occurs during the axial fixing stroke of the dispensing member P' on the reservoir R'.

In the two embodiments, as well as in their considerable variants, an insert 2, 2' forms an integral part of the reservoir of the invention, in this sense that it is already integrated to the reservoir, before transferring the dispensing member onto the reservoir. The movement of the insert under the urging of the inlet sleeve to pierce or dislodge the dip tube is an essential feature of the invention. The insert is permanently integral with the basket, even if its piercing element can be moved in the basket. The formation of a buffer space 10, 10' is also interesting, as it makes it possible to collect and trap any fluid product which could leak through the one-directional flap 13, which could moreover be replaced by a one-directional filter. The insert also makes it possible to keep the dispensing member in a very satisfactory state of cleanliness, which is particularly advantageous, since the reservoir of the invention is mainly intended to serve as a refill, which implies that the dispensing member is led to be dismounted from an empty reservoir to then be remounted on a full reservoir.

The invention claimed is:

1. A fluid product reservoir comprising a container defining a collar and a mounting part mounted on the collar, the mounting part forming a basket disposed at the collar and a dip tube which extends from the basket into the container, the dip tube being initially blocked by a sealing member, the fluid product reservoir further comprising an insert disposed in the basket, the insert comprising a piercing element, at least a portion of the piercing element configured to move inside the basket between an initial position wherein the sealing member blocks flow of the fluid product in the dip tube and a final position wherein the piercing element is moved in a state piercing the sealing member, wherein the insert is housed inside the basket and comprises a cuff forming a receiving housing for the fitting of an inlet sleeve of a dispensing member, the cuff being integral in movement with the piercing element.

2. The fluid product reservoir according to claim 1, wherein the insert is integral with the basket in the initial position and in the final position.

3. The fluid product reservoir according to claim 1, wherein the basket and the insert together delimit a buffer space, which communicates with the outside in the final position of the insert and which communicates with the container through a one-directional flap letting air from the buffer space enter into the container.

4. The fluid product reservoir according to claim 1, wherein the mounting part comprises a fixing bushing for the mounting of a dispensing member, comprising an inlet sleeve and a fixing ring adapted to engage with the fixing bushing.

5. The fluid product reservoir according to claim 4, wherein the dispensing member is a pump.

6. The fluid product reservoir according to claim 1, wherein the insert is slidingly mounted in the basket between the initial and final positions, the insert being in sealed contact with the basket in the initial position and in non-sealed contact with the basket in the final position.

7. The fluid product reservoir according to claim 1, wherein the insert comprises a deformable membrane connecting the piercing element to a fixed edge integral with the basket, the insert being made integrally with the mounting part.

8. The fluid product reservoir according to claim 1, wherein the insert is snap-fitted in the basket in the final position.

9. The fluid product reservoir according to claim 1, wherein the insert forms an insertion shaft, which is blocked by a tearable or pierceable lid, which extends to an upper edge of the basket.

10. The fluid product reservoir according to claim 1, wherein the sealing member is a pierceable membrane which remains connected to the dip tube once pierced, the dip tube forming an internal shoulder under which the pierceable membrane, once pierced, is housed.

11. The fluid product reservoir according to claim 1, wherein an upper extension of the basket forms a threaded bushing which projects beyond a fixing cup, which engages around the collar of the container.

12. The fluid product reservoir according to claim 11, wherein the fixing cup is snap-fitted around the collar of the container.

13. The fluid product dispenser comprising a fluid product reservoir according to claim 1 and a dispensing member, comprising an inlet sleeve and a fixing ring to fix the dispensing member on the fluid product reservoir, wherein the inlet sleeve is fitted in the receiving housing of the cuff.

14. The dispenser according to claim 13, wherein the mounting part forms a fixing bushing, the fixing ring engaging with the fixing bushing on an axial fixing stroke, engagement of the inlet sleeve in the receiving housing and/or movement of the sealing member by the piercing element occurring during the axial fixing stroke.

15. The dispenser according to claim 14, wherein the fixing ring is threaded to the fixing bushing.

16. The dispenser according to claim 14, wherein the sealing member is a pierceable membrane, the fixing ring is a fixing ring to be screwed, the piercing element is a bevelled tube section (21; 21'), the fixing ring to be screwed, during its screwing on the fixing bushing, moves the inlet sleeve and the insert over an axial screwing stroke, the bevelled tube section piercing the pierceable membrane during this axial screwing stroke.

17. The fluid product reservoir according to claim 1, wherein the sealing member, when blocking the dip tube, is disposed below the basket when the fluid reservoir is oriented upright.

18. The fluid product reservoir according to claim 1, wherein the cuff and the piercing element form a one-piece integral construction.

19. The fluid product reservoir according to claim 1, wherein a majority of the insert is housed inside the basket.

20. The fluid product reservoir according to claim 1, wherein the sealing member, when blocking the dip tube, is located in the dip tube.

* * * * *